R. R. SEARLES.
BALL BEARING.
APPLICATION FILED MAR. 29, 1921.

1,418,886. Patented June 6, 1922.
2 SHEETS—SHEET 1.

Inventor
R. R. Searles
By his Attorneys
Mitchell & Allyn

R. R. SEARLES.
BALL BEARING.
APPLICATION FILED MAR. 29, 1921.
1,418,886.
Patented June 6, 1922.
2 SHEETS—SHEET 2.
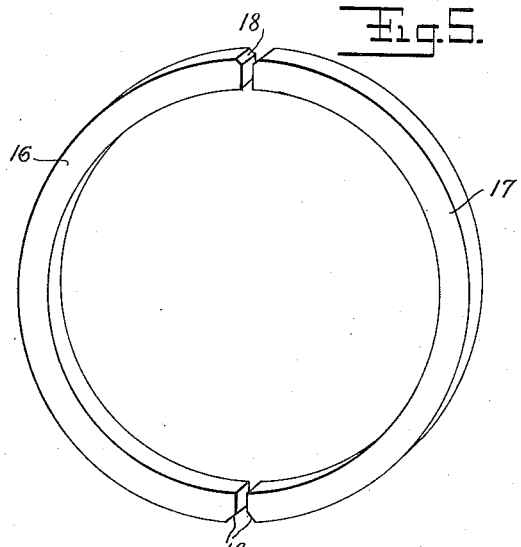
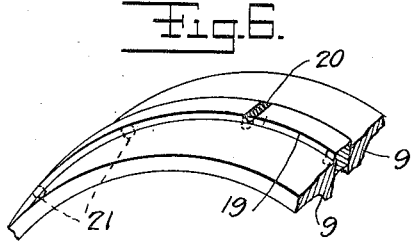
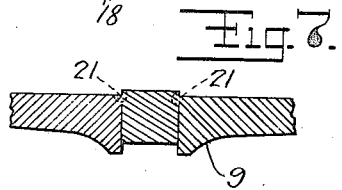
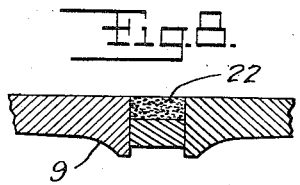
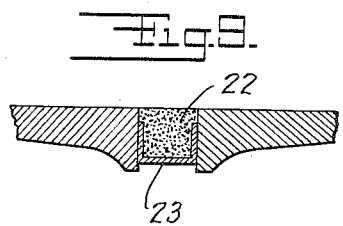
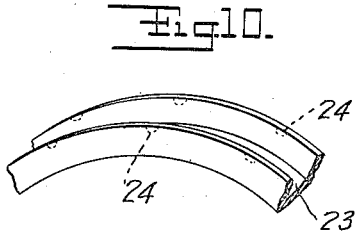
Inventor
R. R. Searles
By his Attorneys
Mitchell & Allen

UNITED STATES PATENT OFFICE.

RAYMOND R. SEARLES, OF NEW BRITAIN, CONNECTICUT, ASSIGNOR TO THE FAFNIR BEARING COMPANY, OF NEW BRITAIN, CONNECTICUT, A CORPORATION OF CONNECTICUT.

BALL BEARING.

1,418,886.  Specification of Letters Patent.  Patented June 6, 1922.

Application filed March 29, 1921. Serial No. 456,513.

*To all whom it may concern:*

Be it known that I, RAYMOND R. SEARLES, a citizen of the United States of America, residing at New Britain, Connecticut, have invented a new and useful Ball Bearing, of which the following is a specification.

My invention relates to a double row ball bearing of the type wherein one bearing ring is made in sections to permit the introduction of balls between the rings after which the ring sections are separated and held in separated position by means of a spacer.

It is an object of my invention to provide improved means of holding a spacer in place.

It is a further object to provide a bearing of the type described which will have a finished and workman-like appearance when completed.

It is a more specific object to provide means for homogeneously uniting parts of the spacer to each other and to the bearing ring sections.

Other objects will appear as the specification proceeds.

Briefly stated, in the preferred form of my invention there is provided a bearing ring with race ways thereon, each race way having a bearing surface facing inwardly, and a second bearing ring formed in sections and each section having thereon a bearing surface facing outwardly. The sections are moved toward each other and balls assembled in the race ways in the two rings after which the parts of the sectional ring are separated and a spacer placed between the sections to hold the balls in position to co-operate with the bearing surfaces. The spacer is held in place by a body of metal and the spacer element is preferably homogeneously united to the ring sections in order to form a rigid bearing and present a finished appearance when completed.

In the drawings, I have shown for illustrative purposes only various forms in which the invention may be embodied.

Fig. 5 is a perspective view of one form of spacer.

Fig. 6 is a fragmentary view showing a modified method of homogeneously uniting the spacer to the ring sections.

Fig. 7 is a sectional view of the ring shown in Fig. 6.

Fig. 8 is a fragmentary sectional view of a means for holding the spacer between the ring sections.

Fig. 9 is a view similar to Fig. 8 but showing a different form of spacer.

Fig. 10 is a fragmentary perspective view of the form of spacer shown in Fig. 9, and having indicated thereon means for homogeneously uniting the same to the ring sections.

In said drawings, 5 indicates one of the bearing rings provided with two race ways therein, each race way having a bearing surface 6. The other bearing ring, in this case the outer ring, is formed in two sections 7—8. Each of the sections has a bearing surface 9 thereon facing outwardly. By having the bearing surface face inwardly or outwardly is meant that the normal to the bearing surface in the direction of the balls is in a direction toward or away from the plane passing between the two rows of balls.

Figure 3:
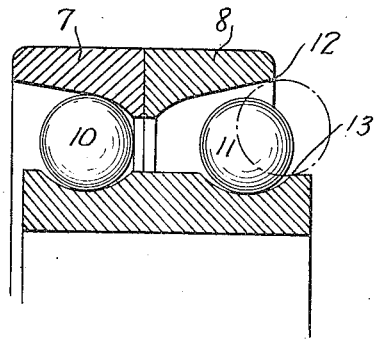
Fig. 3 is a partially diagrammatic sectional view showing how the balls may be assembled between the rings.

In assembling the bearing, one row of balls such as 10 is placed between the inner ring and one of the sections such as 7. The other section 8 of the sectional bearing ring is then placed adjacent the section 7, and a second row of balls 11 are then placed in the race ways in the section 8 and ring 5, the distance between the points 12 and 13 (Fig. 3) being sufficient when the sections are together to permit the introduction of the balls.

After the requisite number of balls has been assembled with the rings, the two parts of the sectional ring are separated and a spacer element such as 14 is placed between the edges of the sections 7—8. The width of the spacer 14 should be such as to cause the balls to engage the surfaces 6 and 9 on the two rings with just sufficient force to give the required rigidity of bearing without unduly increasing the friction between the balls and rings. It will be seen that the bearing will be an adjusted structure, and that the inner and outer bearing rings will be held in their positions relative to each other by means of the balls. The spacer elements should be of such a size or so constructed that when the same are in place there will be a recess or space at the outer side to afford room for the introduction of a keeper means which will serve to prevent any portion of the spacer from rising above the adjacent cylindrical surface of the bearing.

Figure 4:
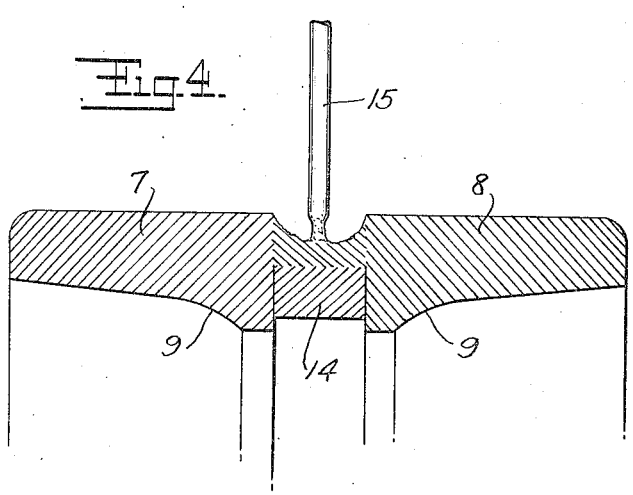
Fig. 4 is a partially diagrammatic sectional view showing one method of homogeneously uniting the spacer to the ring sections.

After the bearing is assembled as above indicated, the aforesaid recess or space is preferably filled with a fusible metal which operates as a means to hold the spacer in place. This metal may be such that the spacer 14 is preferably homogeneously united with the ring sections. This uniting is preferably performed by depositing metal from a fusible electrode 15 on to the spacer and between the edges of the ring sections. While it may be desirable to have an iron or steel electrode 15 for depositing that metal on the parts for homogeneously uniting them, it it to be understood that this welding operation may be performed with some other metals such as brass. It is to be understood that whatever form of fusible electrode is used, the metal should be of such character as to preferably homogeneously unite the parts and not merely fill up the space for holding the parts in position without being united thereto. In the form shown in Fig. 4 the metal will preferably be deposited in such an amount as to extend beyond the normal surface of the bearing, and the excess of deposited metal will thereafter be ground off flush with the adjacent cylindrical surface of the two-part bearing ring to provide a finished appearance in the bearing when completed. As above indicated, the welding will preferably be done by the so-called arc welding process, in which the metal is deposited from the electrode itself, upon the passage of current.

Figure 1:
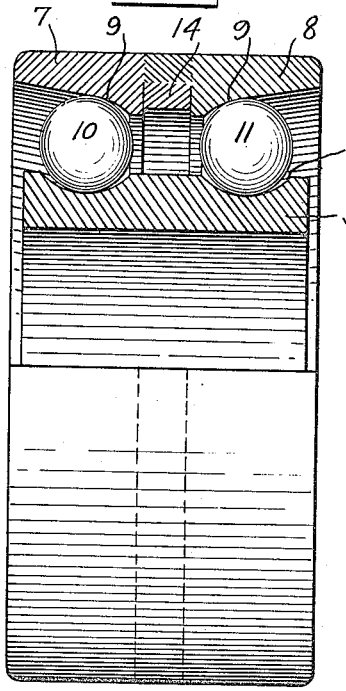
Figure 1 is an elevation of a completed bearing, parts being shown in section.
Figure 2:
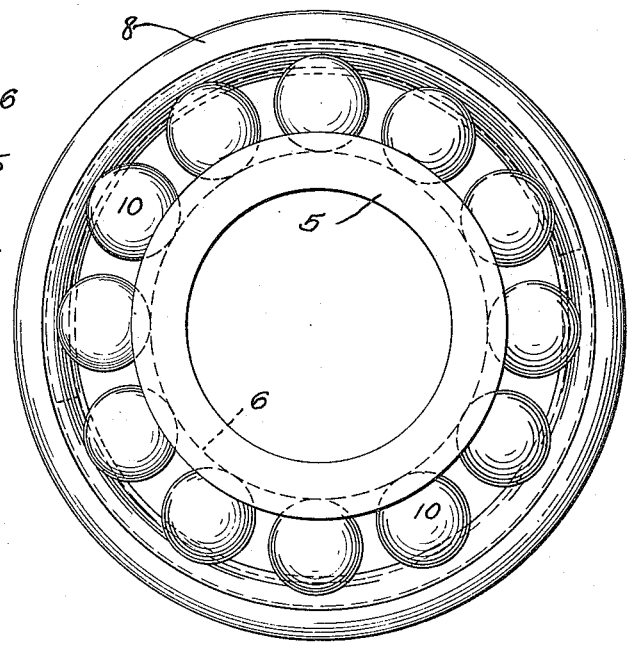
Fig. 2 is a side elevation of a completed bearing.

As shown particularly in Figs. 2, 5, and 6, the spacer element is preferably in the form of a split ring, and if desired, may be made in two or more parts 16—17. When made in two parts as shown in Fig. 5, the spacer is slightly easier to assemble than when otherwise made. The adjacent ends of the spacer parts are preferably beveled off as indicated at 18, for a purpose to be described. Instead of placing the spacer between the rings and filling or building up the space between the edges of the sections 7—8 with deposited metal, there are advantages in having a spacer of such dimensions as to be flush with or to extend slightly above the surface of the ring as indicated at 19 in Fig. 6. With a spacer thus assembled, a smaller amount of metal is required to homogeneously unite the spacer to the bearing ring sections and to each other. In this form, the metal will be deposited as at 20 between the beveled surfaces 18, and this deposited metal will preferably homogeneously unite the parts of the spacer to each other and to the bearing rings. If desired, the spacer may be united at other points such as 21 to the ring sections. When the bearing as shown in Fig. 6 is completed, the excess metal of the spacer and deposited metal is ground off to present a smooth and uniform appearance.

While it is highly desirable to homogeneously unite the spacer to the ring sections as above indicated, it is possible to merely hold the spacer in place without uniting the same to the sections at all. This result may be accomplished as shown in Figs. 8 and 9 by running soft metal such as solder or lead into the space between the spacer and the ring sections to fill up as indicated at 22. This soft metal may either be run in in the molten state or forced or extruded into the space while in the solid state. It is to be understood that this soft metal acts merely as a mechanical fastener for holding the spacer in place and that the spacers are not homogeneously united to the ring sections.

In Fig. 10 has been shown a different form of spacer. In this modification the spacer is of channel form 23, and if desired, may be made of sheet metal. Such a spacer has been shown in place in Fig. 9. If desired, this channeled form of spacer may be homogeneously united to the ring sections at spots as diagrammatically indicated at 24 in Fig. 10. The sides of the spacer in Fig. 10 may be slightly springy to provide a resilient spacer if desired.

It will be seen that in my improved form of bearing the spacer element is permanently held between the ring sections and takes whatever strains or forces that tend to force the sections together.

While I have shown various forms of the invention, I wish it to be understood that many changes may be made within the scope of the appended claims.

I claim:

1. In a ball bearing of the unit handling class, two bearing rings, one of said rings being formed of two sections, each of said sections having a ball track thereon, complementary ball tracks on the other section, balls between said rings, said balls operating to hold said two sections of the two-section rings against separation, a spacer between the edges of said two sections operating to hold said two sections apart and in operative relation with regard to said balls, and means for holding said spacer in operative position with relation to said two sections to prevent said spacer from projecting beyond the adjacent cylindrical surface of the bearing ring formed by said two sections.

2. A ball bearing possessing the characteristics set forth in claim 1 and in which the means for holding the spacer in operative position also operates to effect a substantially homogeneous connection between said spacer and the ring sections spaced thereby.

RAYMOND R. SEARLES.